(12) United States Patent
Klumpp et al.

(10) Patent No.: US 9,106,111 B2
(45) Date of Patent: Aug. 11, 2015

(54) OUTER BODY OF AN ELECTROMECHANICAL ENERGY CONVERTER

(75) Inventors: Daniel Klumpp, Baden-Baden (DE); Dariusz Suarez-Seminario, Achern (DE); Alain-Bernard Isel, Riedseltz (FR)

(73) Assignee: Robert Bosch GmbH, Stuttgart (DE)

(*) Notice: Subject to any disclaimer, the term of this patent is extended or adjusted under 35 U.S.C. 154(b) by 323 days.

(21) Appl. No.: 13/576,825

(22) PCT Filed: Dec. 6, 2010

(86) PCT No.: PCT/EP2010/068949
§ 371 (c)(1),
(2), (4) Date: Jan. 24, 2013

(87) PCT Pub. No.: WO2011/095243
PCT Pub. Date: Aug. 11, 2011

(65) Prior Publication Data
US 2013/0113319 A1 May 9, 2013

(30) Foreign Application Priority Data

Feb. 2, 2010 (DE) .................. 10 2010 001 500

(51) Int. Cl.
  *H02K 1/17* (2006.01)
  *H02K 1/18* (2006.01)
  *H02K 15/03* (2006.01)
  *H02K 23/04* (2006.01)

(52) U.S. Cl.
CPC .. *H02K 1/17* (2013.01); *H02K 1/18* (2013.01); *H02K 15/03* (2013.01); *H02K 23/04* (2013.01); *Y10T 29/49009* (2015.01)

(58) Field of Classification Search
CPC ........... H02K 1/17; H02K 1/18; H02K 23/04; H02K 1/185
USPC ............. 310/154.12, 154.13, 154.01, 154.07, 310/154.16, 154.08, 154.03
See application file for complete search history.

(56) References Cited

U.S. PATENT DOCUMENTS 4,642,502 A * 2/1987 Carpenter et al. ....... 310/156.12
7,569,960 B2 * 8/2009 Hirabayashi ............. 310/154.08
(Continued)

FOREIGN PATENT DOCUMENTS

DE  102007014348  10/2008
JP  61196747  8/1986
(Continued)

OTHER PUBLICATIONS

International Search Report for Application No. PCT/EP2010/068949 dated Apr. 15, 2011 (English Translation and Original, 4 pages).

*Primary Examiner* — Terrance Kenerly
(74) *Attorney, Agent, or Firm* — Michael Best & Friedrich LLP

(57) ABSTRACT

In an electromechanical energy converter having an outer body and an inner body, which are mounted movably relative to one another about an axis of rotation, an outer body according to the invention surrounds an annular structural element, a permanent magnet and a support ring which is received concentrically in the structural element. The support ring comprises a recess to receive the permanent magnet, and the recess has a boundary surface which extends parallel as to a radius of the axis of rotation.

16 Claims, 3 Drawing Sheets

(56) References Cited

U.S. PATENT DOCUMENTS

2004/0113504 A1* 6/2004 Agnes et al. ............ 310/154.08
2005/0184610 A1 8/2005 Agnes et al.

FOREIGN PATENT DOCUMENTS

| | | |
|---|---|---|
| JP | H08205433 | 8/1996 |
| JP | 2003274578 | 9/2003 |

* cited by examiner

OUTER BODY OF AN ELECTROMECHANICAL ENERGY CONVERTER

BACKGROUND OF THE INVENTION

An electromagnetic energy converter, which in the form of an electric motor converts an electrical current into a rotational movement or in the form of a generator converts a rotational movement into an electrical current, conventionally comprises two bodies which are arranged so as to be movable relative to one another about an axis of rotation. That body which is static in relation to an observer is referred to as the stator, and the movable body is referred to as the rotor. The stator often comprises a so-called pole pot in which a number of permanent magnets are distributed over a radial inner surface. A rotor which corresponds to the stator comprises a number of electromagnets which interact electromagnetically with the permanent magnets. The permanent magnets are conventionally adhesively bonded in the pole pot and are alternatively or additionally braced by means of elastic elements. The elastic elements are for example spring clips which force adjacent permanent magnets apart in the circumferential direction and lock them on the pole pot.

If an adhesive bond is not possible for example from a manufacturing aspect or from a loading aspect, a fastening of the permanent magnets by means of spring clips may be problematic if the dimensions of the permanent magnets and the spacings thereof lie below certain practically manageable thresholds.

SUMMARY OF THE INVENTION

It is an object of the invention to specify a stator for an electromagnetic energy converter, which realizes an improved fastening of the permanent magnets. It is a further object of the invention to specify a method for assembling the stator.

In an electromechanical energy converter having an outer body and having an inner body which are mounted so as to be movable relative to one another about an axis of rotation, an outer body according to the invention comprises an annular structural element, a permanent magnet and a support ring which is accommodated concentrically in the structural element, wherein the support ring comprises a cutout for receiving the permanent magnet and the cutout has a delimiting surface which extends parallel to a radius of the axis of rotation.

It is advantageously possible for forces between the permanent magnet and the support ring, which may arise for example during the operation of the electromechanical energy converter, to be transmitted by the delimiting surface, such that a fastening of the permanent magnets by means of an adhesive and/or by means of a discrete spring element is not necessary. In this way, the manufacture of the outer body can be simplified and/or the operational reliability of the electromechanical energy converter can be improved.

The permanent magnet may be delimited by a surface which extends in a plane which encompasses the axis of rotation. Here, the permanent magnet may be designed to be curved about the axis of rotation. In another embodiment, the surface which delimits the permanent magnet extends in a plane which runs parallel to, but which does not encompass, the axis of rotation. Here, the permanent magnet may be of non-curved form, that is to say it may comprise substantially only planar surfaces, for example by being of cuboidal form. In both cases, the surface of the permanent magnet bears against the delimiting surface of the support ring and the delimiting surface of the support ring extends in a plane parallel to the axis of rotation.

The structural element preferably has a radial inner surface for mounting the permanent magnet in the radially outward direction, wherein the inner surface of the structural element extends perpendicular to a radius of the axis of rotation. Form-fitting mounting of the permanent magnet, and rotational locking of the support ring, can be realized by means of the thus at least sectionally polygonal form of the radial inner surface of the structural element. Furthermore, in the specified way, a large-area transmission of force between the permanent magnet or the support ring and the structural element is attained, such that locally highly loaded bearing surfaces, which may lead to damage to the permanent magnet, to the support ring and/or to the structural element, can be avoided. The structural element may be in the form of a magnetic yoke element for the permanent magnet, wherein the described areal contact with the permanent magnet advantageously promotes the transmission of a magnetic field.

The permanent magnet may have a planar radial outer surface for engaging with the planar radial inner surface of the structural element; here, the permanent magnet may have an equal thickness and may in particular be cuboidal. The cuboidal form is a standard design for permanent magnets, such that cheap standard permanent magnets can be installed.

The permanent magnet may comprise a lanthanoid (a "rare earth"). Particularly powerful permanent magnets can be produced from lanthanoids, in particular in conjunction with neodymium and/or samarium. Such high-power magnets may be of very compact dimensions, and in particular relatively thin in the radial direction. The fastening according to the invention of the permanent magnet with respect to the structural element may be used particularly advantageously in the case of thin permanent magnets, because a fastening of the permanent magnet by means of spring elements, clips or rivets is difficult owing to the small engagement surfaces.

The support ring and the structural element may have radial elements, which engage into one another, for securing against relative rotation about the axis of rotation. Such radial elements may comprise for example a lug which extends in the radial direction, and a groove which corresponds to the lug. An additional securing action against rotation of the support ring in the structural element can be attained in this way. Furthermore, an axial insertion of the support ring into the structural element can be facilitated by the radial elements which engage into one another.

The support ring may have, in the region of the cutout, a holding element for mounting the permanent magnet in the radially inward direction. By means of the holding element, the permanent magnet can advantageously be prevented from falling into the structural element during assembly and/or during operation of the electromagnetic energy converter. The outer body may comprise an axial closure element for closing off the structural element, wherein the structural element is of pot-shaped form with a base, and the support ring is mounted axially on the base of the structural element and on an inner surface of the closure element. The outer body thus formed, the permanent magnet of which is locked in both axial directions, both radial directions and both circumferential directions, can be assembled easily and quickly.

A method for assembling an outer body comprises the steps of providing an annular structural element, a permanent magnet and a support ring which is designed to be accommodated in the structural element concentrically about an axis of rotation, wherein the support ring comprises a cutout for receiving the permanent magnet and the cutout has a delimiting surface which extends parallel to a radius of the axis of rotation.

The method according to the invention comprises only a small number of simple steps, with which the elements of the outer body can be joined together in a simple and efficient manner. A multiplicity of outer bodies according to the invention can easily be mass-produced manually, in automated fashion or in combined manual and automated fashion.

During the insertion of the permanent magnet, the support ring may be aligned substantially perpendicular to the force of gravity, such that the permanent magnet is inserted perpendicular to the force of gravity. The use of auxiliary devices for temporarily fixing the permanent magnet in the support ring during assembly can thereby be facilitated or eliminated.

The method may furthermore comprise the step of axially closing off the structural element in a closure element, wherein the structural element is of pot-shaped form with a base and the support ring is mounted axially between the base of the structural element and an inner surface of the closure element. Said step may precede an insertion of an inner body of the energy converter, such that both the assembly of the outer body and also the assembly of the energy converter can be completed by means of the described step.

BRIEF DESCRIPTION OF THE DRAWINGS

The invention will be described in more detail below with reference to the appended drawings, in which.

DETAILED DESCRIPTION

Figure 1:
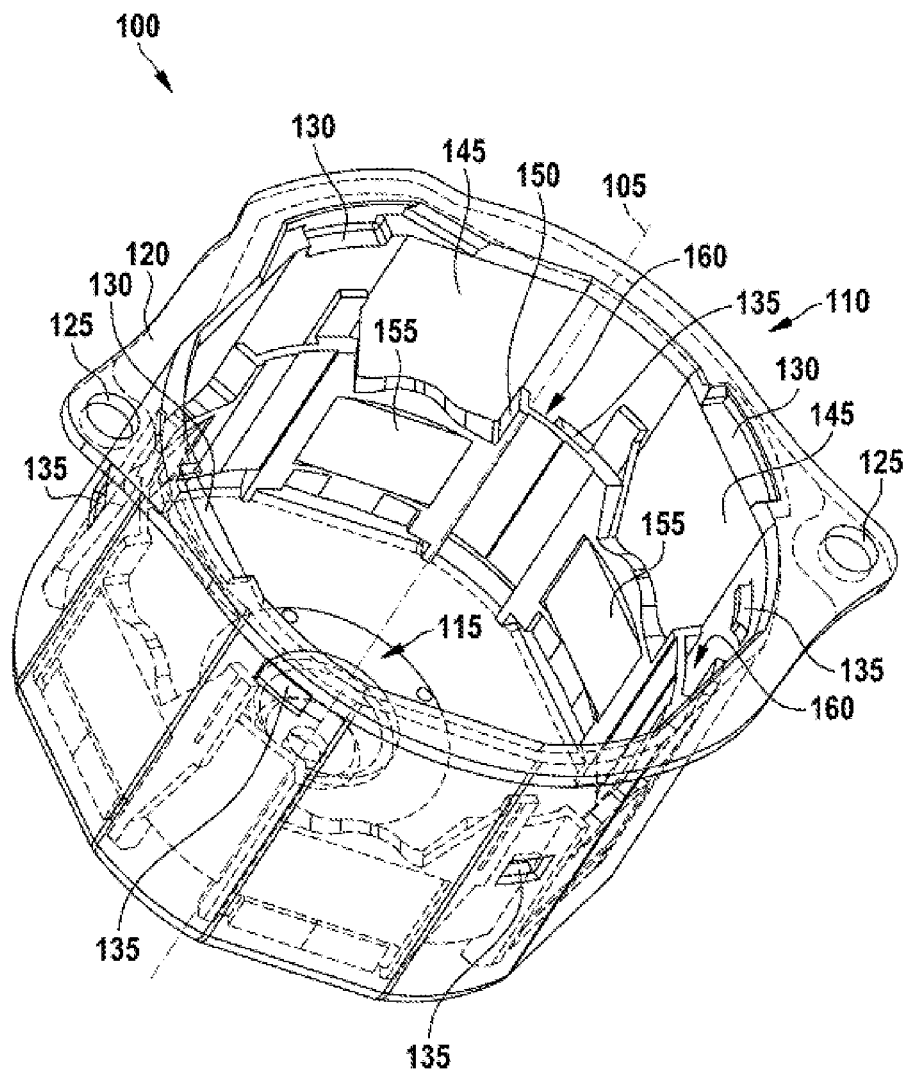
FIG. 1 shows a stator of an electric motor.

FIG. 1 shows a stator 100 of an electric motor in a perspective and partially transparent illustration. The electric motor, as one possible exemplary embodiment of an electromechanical energy converter, comprises an outer body in the form of the stator 100 and an inner body (not illustrated) which, in the illustration of FIG. 1, is a rotor.

A pole pot 110 with a base 115 and a flange 120 extends along an axis of rotation 105. The flange 120 extends radially outward at a top end of the pole pot 110 and has two moldings with in each case one fastening hole 125 for fastening the electric motor. In the region of an inner delimitation of the flange 120, three depressions 130 in the axial and radial direction are formed into the pole pot 110. Lugs 135 extend in the radially inward direction from a wall of the pole pot 110. The lugs 135 are formed at different distances from the base 115.

The pole pot 110 comprises a number of planar inner surfaces 145 which interrupt an otherwise circularly curved wall of the pole pot 110 at regular intervals. The lugs 135 are formed in each case on curved portions of the pole pot 110 which are situated between the inner surfaces 145. In the pole pot 110 there is accommodated a support ring 150, the radial outer side of which is, in sections, in form-fitting engagement with the radial inner side of the pole pot 110. The support ring 150 bears against the base 115 of the pole pot 110. The support ring 150 comprises a row of cutouts in which in each case one cuboidal permanent magnet 155 is accommodated such that the permanent magnet 155 bears areally against one of the inner surfaces 145 of the pole pot 110. The support ring 150 furthermore comprises grooves 160 which run parallel to the axis of rotation 105 and which are formed so as to correspond with the lugs 135 in such a way that the support ring 150 can be inserted into the pole pot 110 along the axis of rotation 105 from above until said support ring bears against the base 115. Here, a rotation of the support ring 150 about the axis of rotation 105 is prevented by an engagement, in the circumferential direction, between the lugs 135 and the grooves 160.

The support ring 150 is manufactured from a non-magnetic material, for example from a plastic. Forces exerted on the support ring 150 in the circumferential direction by the permanent magnets 155 are transmitted to the pole pot 110 as a result of the form fit of the support ring 150 with the pole pot 110. The lugs 135 and the grooves 160 which correspond thereto can likewise transmit forces, which act in the circumferential direction, between the support ring 150 and the pole pot 110. Flanks of the lugs 135 may bear at one side or at both sides against the corresponding grooves 160 so as to transmit forces, which arise in the event of a rotation of the pole pot 110 relative to the support ring 150 about the axis of rotation 105, in one or both directions of rotation.

The pole pot 110 may be composed of a magnetically soft material, such that it can be used not only for receiving other elements but also for conducting magnetic fields between the permanent magnets 155. In the illustrated embodiment, an inner diameter of the pole pot 110 is approximately 40-65 mm. The permanent magnets 155 are preferably high-power magnets formed from a neodymium-iron-boron compound or a samarium-cobalt compound. A thickness of the cuboidal permanent magnets 155 in the radial direction is approximately 1.5 mm-2.5 mm. The stator 100 illustrated in FIG. 1 is part of an electric motor with a power of up to 200 W, preferably of approximately 50-180 W, and is provided for use in an ABS hydraulic system for use in a motor vehicle.

The stator 100 can be completed to form an electric motor and/or generator by the insertion of a rotor (not illustrated) along the axis of rotation 105, and the mounting of a rear cover (likewise not illustrated). The cover may engage into one or more of the depressions 130 and thus be secured against rotation.

Figure 2:
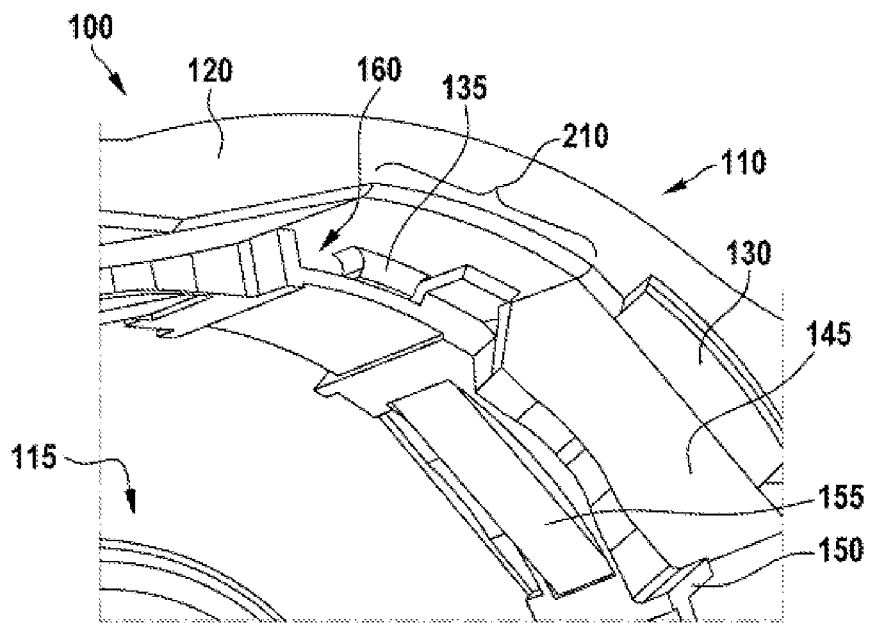
FIG. 2 shows a detail of the stator from FIG. 1.

FIG. 2 shows a detail view of the stator 100 from FIG. 1 from a different perspective. It can be clearly seen how the permanent magnet 155, the largest planar outer surface of which points radially outward, bears areally against the planar inner surface 145 of the pole pot 110. The support ring 150 likewise bears areally against the pole pot 110 in the region of the inner surface 145. The support ring 150 does not bear areally against a curved portion 210 of the pole pot 110 adjacent to the inner surface 145, but rather forms a groove 160 for receiving the lug 135 of the pole pot 110. The support ring 150 can thereby be inserted in the axial direction into the pole pot 160, and thereafter conducts forces acting in the circumferential direction into the pole pot 110. In the embodiment illustrated, only one flank of the groove 160 bears against the lug 135 in the circumferential direction. If forces in the circumferential direction between the support ring 150 and the pole pot 110 are to be expected only in one direction, for example because the direction of rotation of the electric motor is invariable, said forces can be transmitted by the one-sided engagement between the lug 135 and the groove 160. At the same time, the groove 160 is designed to be so wide that a certain clearance remains on that side of the lug 135 which is not in engagement with the groove 160, such that free axial movement of the support ring 150 is permitted during assembly in the pole pot 110, without the need for a highly precise fit between the lug 135 and the groove 160.

Figure 3:
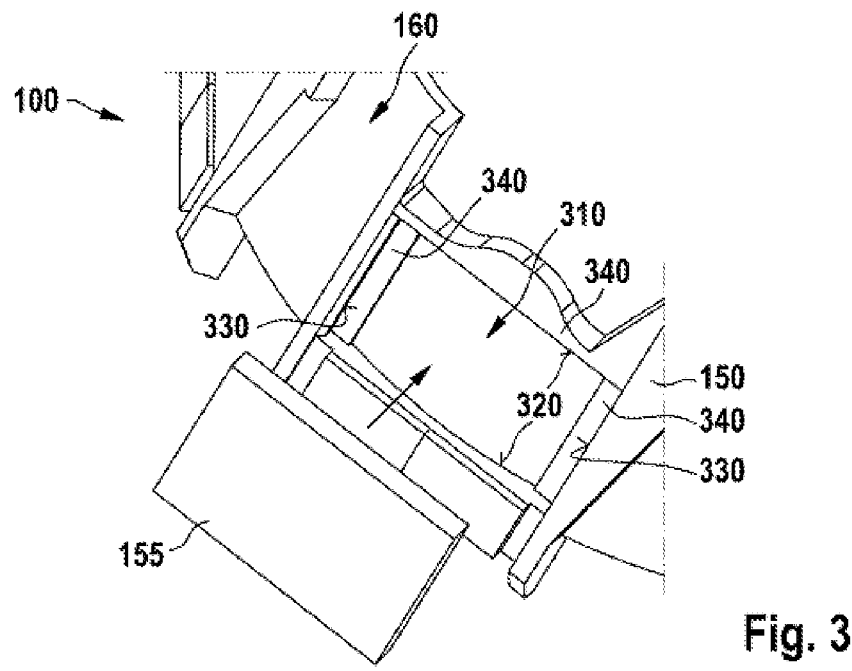
FIG. 3 shows a further detail of the stator from FIGS. 1 and 2.

FIG. 3 shows a further detail of the stator 100 from FIGS. 1 and 2 from yet another perspective. The support ring 150 and the permanent magnet 155 are shown in an exploded illustration from the outside, with the viewing direction toward the axis of rotation 105.

The support ring 150 has a cutout 310 for receiving the permanent magnet 155. The cutout 310 is defined by two mutually opposite axial delimitations 320, and by two mutually opposite delimitations 330 which run in the circumferential direction, of the support ring 150. The delimitations 330 extend in a plane which runs parallel to the axis of rotation 105 (not illustrated) but which does not encompass the axis of rotation 105. Said embodiment corresponds to the illustrated cuboidal form of the permanent magnet 155. In another embodiment, the permanent magnet 155 is formed so as to be curved about the axis of rotation 105 in the manner of a shell, and the delimitations 330 extend in a plane which encompasses the axis of rotation 105. Two holding elements 340 form axial contact surfaces for the permanent magnets 155.

When the permanent magnet 155 has been inserted into the cutouts 310, a part of that side of the permanent magnet 155 which faces away from the viewer, said side bearing against the inner surface 145 of the pole pot 110 in FIGS. 1 and 2, rests on the holding elements 340 in the radially inward direction, such that the permanent magnet 155 is fixed in the radial direction between the support ring 150 and the pole pot 110. Fixing of the magnet 155 relative to the support ring 150 in the circumferential direction and in the axial direction is realized by means of a form fit of the outer edges of the permanent magnets 155 with the delimitations 330 and 320 of the cutout 310. The permanent magnet 155 is thereby fully fixed relative to the pole pot 110 when the support ring 150, as illustrated in FIG. 1, has been pushed axially into the pole pot 110 and secured in the axial direction against displacement in the upward direction. Said securing is conventionally realized, as explained in more detail above with reference to FIG. 1, by means of a cover which closes off the pole pot axially.

Figure 4:
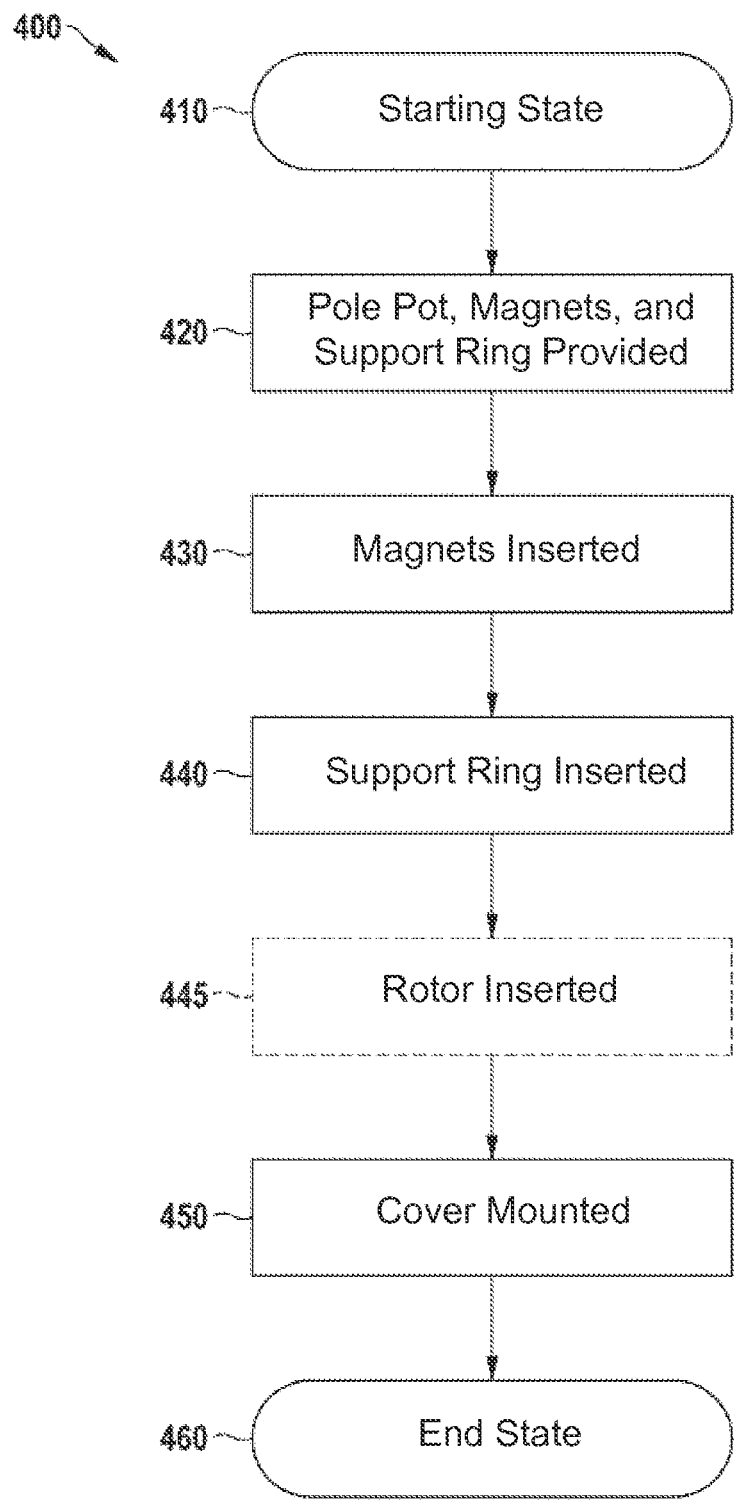
FIG. 4 shows a method for assembling the stator from FIGS. 1 to 3.

FIG. 4 shows a method 400 for producing the stator 100 from FIGS. 1 to 3. In a first step 410, the method 400 is in a starting state. In a subsequent step 420, the pole pot 110, the permanent magnets 155 and the support ring 150 are provided. Then, in a step 430, the permanent magnets 155 are inserted in the radial direction from the outside into the cutouts 310 of the support ring 155. For this purpose, the support ring 150 may be aligned substantially perpendicular to the force of gravity, that is to say the axis of rotation 105 runs in the direction of the force of gravity and the permanent magnets are inserted with a movement perpendicular to the force of gravity. Here, the support ring 150 may be arranged on an assembly mandrel in order to fix it in said position and provide additional strength. The permanent magnets 155 may be inserted into the cutouts 310 with a slight force fit, such that no additional securing of the permanent magnets 155 to prevent them from falling out of the support ring 150 is required during the further course of the process 400.

Subsequently, in a step 440, the support ring 150 with the permanent magnets 155 and possibly the assembly mandrel is inserted axially into the pole pot 110. Alternatively, the pole pot 110 may also be placed over the support ring 150 with the permanent magnets 155. The assembly mandrel can thereafter be removed from the support ring 150.

In a subsequent step 445, which is not necessarily encompassed by the method 400 and which may also be assigned to another method for the final assembly of an electric motor or generator, a rotor is inserted axially into the stator 100.

In a subsequent step 450, by virtue of a cover being mounted axially, the support ring 150 is secured axially in the pole pot 110, and at the same time the electric motor is completed. The method 400 terminates in an end state 460.

What is claimed is:

1. An outer body (100) of an electromechanical energy converter having an outer body (100) and having an inner body which are mounted so as to be movable relative to one another about an axis of rotation (105), wherein the outer body (100) comprises the following:
   an annular structural element (110);
   a permanent magnet (155); and
   a support ring (150) which is accommodated concentrically in the structural element (110);
   wherein the support ring (150) comprises a cutout (310) for receiving the permanent magnet (155) and the cutout (310) has a delimiting surface (330) which extends parallel to a radius of the axis of rotation (105);
   wherein the permanent magnet (155) is cuboidal;
   wherein largest side surfaces of the permanent magnet (155) extend perpendicular to a radius of the axis of rotation (105);
   wherein the support ring (150) has, in a region of the cutout (310), a holding element (340) for supporting the permanent magnet (155) in the radially inward direction;
   wherein the support ring (150) extends radially inward no farther than a most radially inward surface of the permanent magnet (155); and
   wherein an interior surface of the support ring (150) defines a circle, and the most radially inward surface of the magnet (155) forms a cord line extending between two points on the circle.

2. The outer body (100) as claimed in claim 1, characterized in that the structural element (110) has a radial inner surface (145) for supporting the permanent magnet (155) in a radially outward direction, wherein the inner surface (145) of the structural element (110) extends perpendicular to a radius of the axis of rotation (105).

3. The outer body (100) as claimed in claim 1, characterized in that the permanent magnet (155) comprises a lanthanoid.

4. The outer body (100) as claimed in claim 1, characterized in that the support ring (150) and the structural element (110) have radial elements (135, 160), which engage into one another, for securing against relative rotation about the axis of rotation (105).

5. The outer body (100) as claimed in claim 1, characterized by a closure element for axially closing off the structural element (110), wherein the structural element is of pot-shaped form with a base (115) and the support ring (150) is mounted axially on the base (115) of the structural element and an inner surface of the closure element.

6. The outer body (100) as claimed in claim 1, wherein the most radially inward surface of the permanent magnet (155) extends radially inwardly farther than the support ring.

7. A method (400) for assembling an outer body (100), comprising the following steps:
   providing (420) an annular structural element (110), a cuboidal permanent magnet (155) wherein largest side surfaces of the permanent magnet (155) extend perpendicular to a radius of the axis of rotation (105), and a support ring (150) which is configured to be accommodated in the structural element (110) concentrically about an axis of rotation (105), wherein the support ring (150) comprises a cutout (310) for receiving the permanent magnet (155) and the cutout (310) has a delimiting surface (330) which extends parallel to a radius of the axis of rotation (105);

radially inserting (430) the permanent magnet (155) into the support ring (150); and axially placing (440) the support ring (150) into the structural element (110), wherein the support ring (150) has, in a region of the cutout (310), a holding element (340) for supporting the permanent magnet (155) in the radially inward direction, wherein the support ring (150) extends radially inward no farther than a most radially inward surface of the permanent magnet (155), and wherein an interior surface of the support ring (150) defines a circle, and the most radially inward surface of the magnet (155) forms a cord line extending between two points on the circle.

8. The method as claimed in claim 7, wherein the support ring (150) is aligned substantially perpendicular to the force of gravity during the insertion of the permanent magnet (155).

9. The method as claimed in claim 7, furthermore comprising the step of axially closing off (450) the structural element (110) by means of a closure element, wherein the structural element (110) is of pot-shaped form with a base (115), and the support ring (150) is mounted axially between the base (115) of the structural element (110) and an inner surface of the closure element.

10. The outer body (100) as claimed in claim 7, characterized in that the permanent magnet (155) comprises a lanthanoid.

11. The outer body (100) as claimed in claim 10, characterized in that the support ring (150) and the structural element (110) have radial elements (135, 160), which engage into one another, for securing against relative rotation about the axis of rotation (105).

12. The outer body (100) as claimed in claim 11, characterized in that the support ring (150) has, in a region of the cutout (310), a holding element (340) for supporting the permanent magnet (155) in a radially inward direction.

13. The outer body (100) as claimed in claim 12, characterized by a closure element for axially closing off the structural element (110), wherein the structural element is of pot-shaped form with a base (115) and the support ring (150) is mounted axially on the base (115) of the structural element and an inner surface of the closure element.

14. The outer body (100) as claimed in claim 1, wherein the delimiting surface (330) supports the magnet (155) circumferentially.

15. The method as claimed in claim 7, wherein the delimiting surface (330) supports the magnet (155) circumferentially.

16. The method as claimed in claim 7, wherein the most radially inward surface of the permanent magnet (155) extends radially inwardly farther than the support ring.

\* \* \* \* \*